March 29, 1960 H. E. TRACY 2,930,636
SELF-ADJUSTING SEAL
Filed March 31, 1958 2 Sheets-Sheet 2

INVENTOR.
HERBERT E. TRACY
BY
Allen E. Hambly
ATTORNEY

2,930,636

SELF-ADJUSTING SEAL

Herbert E. Tracy, Alhambra, Calif., assignor to Borg-Warner Corporation, Chicago, Ill., a corporation of Illinois Application March 31, 1958, Serial No. 725,051

22 Claims. (Cl. 286—11.14)

The present invention relates to mechanical seals, and more particularly to a mechanical seal which is adapted to seal a pump or other rotary shaft against leakage of high pressure fluids though not limited to such usage.

Heretofore, mechanical seals have proven to be generally ineffective in applications where relatively high pressures are encountered; that is, pressures on the order of 1500 p.s.i. and above. Sealing of such high pressures has been accomplished by the use of tandem seals, whereby the high pressure is broken down into a plurality of stages so that if the pressure being sealed against were on the order of 2500 p.s.i. then two seals could be employed, with each seal being subjected to a pressure of approximately 1250 p.s.i. However, such a construction requires substantial space for installation of the multistage or tandem seal assembly inasmuch as the seals are spaced axially along the shaft. In installations where such space is not available, efforts to employ a single stage seal have been unsatisfactory since the seals when subjected to such high pressures have had a very short life, the seal faces scoring and binding after relatively few hours of operation.

A primary object of the present invention is to provide a mechanical seal capable of effectively sealing against high pressures, but the invention may also be advantageously availed of for low pressure applications.

In accordance with the preceding object, the present invention contemplates a mechanical seal which requires a minimum of space to enable its installation, but wherein the pressure being sealed is partially counter-balanced between the seal faces.

It is well known in the mechanical seal field that when a seal is properly functioning there is a film of fluid flowing across the faces producing a pressure gradient across the relatively rotating seal faces from the housing pressure to atmosphere, the force produced by this gradient being a function of the pressure drop across the faces. Accordingly, at an intermediate annular area across the seal faces the pressure will be at an unknown value, approximately one-half of the housing pressure. The present invention avails of this characteristic of mechanical seals and contemplates the provision of means for advantageously employing the fluid pressure at an intermediate annular area between the sealing faces intermediate the peripheries of the sealing rings.

In accordance with the foregoing, it is a further object to provide a mechanical seal construction including relatively rotatable seal means including a sealing ring having a relatively broad radially disposed seal face, and a co-operative plurality of seal rings disposed in opposed relation to the broad seal face and having relatively narrow faces, and including means operable as a function of the pressure drop across the seal faces to automatically adjust or compensate for fluctuations in the pressure drop across the faces in the manner of a servo mechanism, insofar as the respective seal elements of the plurality of members just referred to are sensitive to fluctuations in the pressure drop and are automatically adjusted so as to maintain the seal members in proper operative relationship, and to maintain, in general, a uniform pressure drop across the respective seal faces throughout the life of the seal.

The next preceding objective contemplates, by way of example, a pair of seal members having concentrically disposed mounting portions whereby one of the members is mounted upon the other for relative movement, the members having radially extended intermediate sections disposed in axially spaced relation and defining therebetween a pressure chamber, and the members also having concentric radially spaced end portions providing the aforesaid relatively narrow seal faces, the space between these end portions being in communication with the film of fluid flowing across the seal faces so that the pressure chamber is supplied with fluid under pressure corresponding to the pressure at the intermediate annular area of the broad seal face intersected by the space between the end sections of the self-compensating seal elements, and the intermediate radially extended sections being subjected to such pressure so as to counterbalance the defect of housing pressure acting on the seal elements to the extent necessary to maintain proper sealing relationship between the sealing faces.

In a structure wherein the plurality of self-adjusting seal elements is constituted by a pair, the invention contemplates an arrangement whereby the pair of elements is arranged in concentric relation with the inner seal provided with a predetermined area against which stuffing pressure acts, and a predetermined area against which pressure in the pressure chamber aforesaid acts, thus providing hydraulic balance for the seal.

Other objects and advantages of the invention will be hereinafter described or will become apparent to those skilled in the art, and the novel features thereof will be defined in the appended claims.

In the accompanying drawings.

Like reference characters in the several figures of the drawings and in the following description designate corresponding parts.

Figure 1:
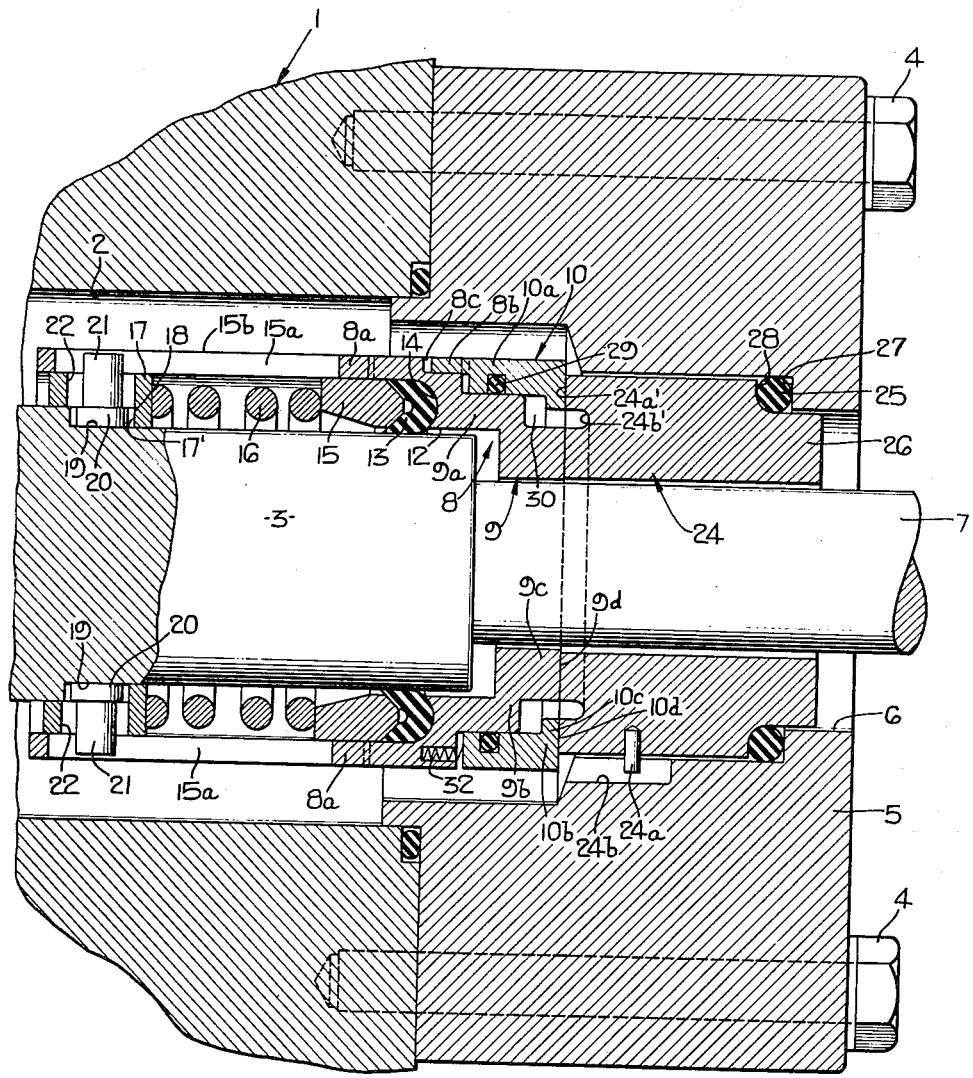
Figure 1 is a view in section taken axially of a mechanical seal assembly embodying the invention with certain of the parts shown in elevation.

Referring to Fig. 1, a pump or other housing is shown at 1, this housing having a shaft opening or stuffing box 2 through which extends a rotary shaft 3. Secured to the outer face of the housing 1, as by means of a suitable number of screws 4, is an annular seal flange 5 having a central opening 6, through which a reduced diameter portion 7 of the shaft 3 extends.

Self-adjusting rotating seal means 8 are disposed about the shaft 3 and include an inner ring 9 and an outer ring 10 concentrically mounted upon the inner ring 9 for rotation therewith and for axail movements relative thereto.

A counterbore 12 of the seal ring 9 provides an annular space between the ring 9 and the shaft, in which is disposed a U-cup packing 13 which is pressed into seating contact with a seat 14 and expanded into engagement with the shaft 3 and with the inner periphery of the seal ring 9 as by means of a wedge-like expander 15. A coiled spring 16 is engaged at one end with the expander 15, and at the other end with a bushing 17 having a shoulder 17' which is in abutting engagement with a shoulder 18 formed on the shaft 3, so that the spring 16 provides means normally biasing the rotating seal means 8 axially in the direction of the seal flange 5.

Means are provided for connecting elements 9 and 10 for rotation as a unit with the shaft and for relative axial movement. In this connection, illustratively, the seal ring 9 has a suitable number of axially extended drive lugs 8a projecting into overlying relation to the expander 15 and into slots 15a formed in an elongated skirt 15b of the expander 15. Ring 10 is provided with a number of lugs 8b which project into slots 8c formed in the outer periphery of ring 10. Leading axially from the shoulder 18 on the shaft 3, is a plurality of slots 19 in which are disposed the heads 20 of a like number of drive pins 21, these pins projecting radially through openings 22 in the bushing 17 and into elongated slots 15a previously referred to, which extend axially in the skirt 15b on the expander 15 so that the seal ring 9 is keyed to the shaft 3 through pins 21, expander skirt 15b and lugs 8a, for rotation therewith, but is free for axial movement thereon.

In conventional mechanical seals heretofore known, the rotating seal means have been in the form of a single element and a non-rotating seal ring has been employed in cooperative sealing relation to the rotating seal ring and operatively connected to the flange, and thus to the housing, so as to be non-rotating. However, when such previous seal constructions were subjected to relatively high pressures across the sealing faces of the relatively rotating seal rings, the axial component of force imparted to the axially movable ring has forced the seal faces into intimate contact and has prevented the flow thereacross of a lubricating film of the fluid being sealed, thus resulting in scoring and destruction of the seal faces which, in practice, are lapped to an optically flat finish. In accordance with the present invention this difficulty, as encountered with previously known seals in high pressure installations, is avoided.

In order to accomplish this, a novel non-rotating seal ring 24 made in accordance with the invention is carried by the flange 5 in the central opening 6 therethrough. The ring 24 may be suitably keyed to the flange 5 as by means of a dowel 24a projecting radially from the ring 24 into an elongated slot 24b interiorly of the flange 5. In order to prevent the flow of fluid through the flange opening 6 between the stationary ring 24 and the flange 5, a static seal is provided as by means of an O-ring 25 encircling a reduced end portion 26 of the ring 24 and disposed between opposed shoulders 27 and 28 on the ring 24 and the flange 5 respectively.

As has been previously mentioned, the sealing rings 9 and 10 are concentrically mounted, one upon the other. To this end, the ring 9 is provided with a longitudinally extended mounting section 9a in which the gasket seat 14 is formed, and upon which an elongated mounting section 10a of the seal ring 10 is slidably mounted. An O-ring or other suitable seal 29 is interposed between the mounting sections 9a and 10a and preferably is seated in a groove formed in the inner periphery of the mounting section 10a.

Projecting radially inwardly from the mounting section 9a and ring 9, is an intermediate section 9b which is connected with an end section 9c of the ring 9 extending axially and having a relatively narrow end face 9d disposed in opposed relation to a relatively broad radially extended face 24a' on the non-rotating ring 24, the broad face 24a' being divided into radially spaced sections as by means of an annular groove 24b' formed in the ring 24.

The outer ring 10 is also provided with a central section 10b projecting radially inwardly in spaced relation to the central sections 9b of the ring 9, so as to define a pressure chamber 30.

In the illustrative embodiment, the ring 10 is provided with an end section 10c of the same diameter as the central section 10b. However, depending upon the nature of the material from which the ring 10 is constructed, the end section 10c may be of a different diameter than the central section 10b. It should be understood that the end section 10c of ring 10 provides a radially disposed seal face 10d disposed in opposed relation to the relatively broad face 24a' of ring 24. In any event, the end sections of the rings 9 and 10 are disposed in radially spaced relation so as to provide communication between the pressure chamber 30 and the central annular area of the ring 24.

The spring 16 previously described, serves to normally bias the seal ring 9 towards the ring 24, while a suitable plurality of equi-distantly spaced coiled springs 32 are interposed between opposing portions of the rings 9 and 10 and normally bais the ring 10 towards the ring 24.

Figure 2:
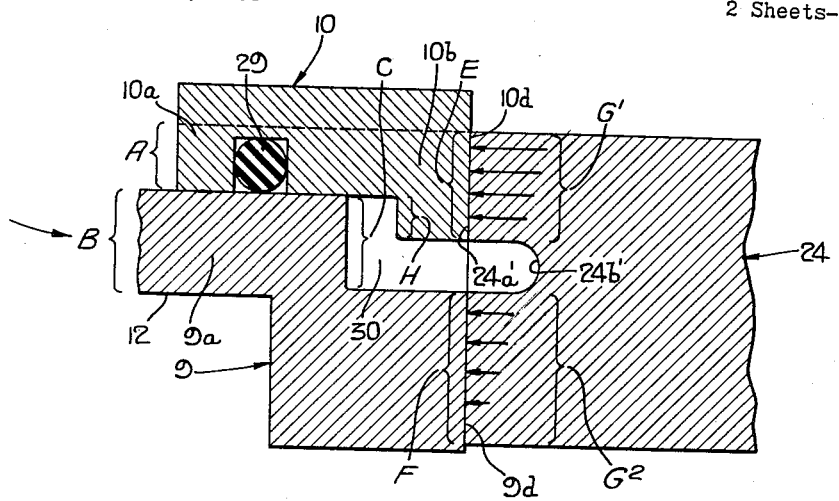
Figure 2 is a diagrammatic view illustrating a seal construction as shown in Fig. 1, and particularly identifying the respective pressure responsive areas of the seal elements whereby self-adjustment of the mechanism is accomplished.

The operation of the seal of this invention thus far described may best be understood upon reference to Fig. 2, wherein the sealing means 8 comprising the rings 9 and 10 are diagrammatically illustrated.

In this view it will be observed that ring 10 has an annular area A, constituted by a portion of the end of mounting portion 10a of the ring. Opposing this area A, is an annular area E constituting the radially disposed face 10d in the illustrative embodiment. The central section 10b of the ring 10 provides an annular area H. The annular areas exteriorly of the areas A and E of the ring 10 are balanced. Thus, the net area responsive to fluid pressure tending to shift the ring 10 in a righthand direction as shown in Fig. 2, is the sum of areas A plus H, while the area responsive to fluid pressure tending to shift the ring 10 in a lefthand direction, is area E.

The pressure acting on area A is stuffing box or housing pressure which may be on the order of, for instance, 2000 p.s.i., whereas the pressure acting on area H is at a value between 2000 p.s.i. and atmospheric pressure, depending upon the pressure drop across face 10d. For the sake of description, assuming that the pressure drop across face 10d is from 2000 p.s.i. to 1000 p.s.i. at the annulus 24b' of ring 24, then the pressure in the pressure chamber 30 acting upon area H will accordingly be 1000 p.s.i. The pressure effective on area E is represented by the pressure gradient $G^1$ which is a function of the pressure drop across the face 10d.

The inner ring 9 has an effective stuffing box pressure responsive area B, an opposing area C subjected to pressure in the chamber 30, and an end area F constituting the radial face 9d opposed by the pressure gradient designated $G^2$ which is a function of the pressure drop from the annulus 24b' to atmospheric pressure across the face 9d.

In the illustrative example, the pressure drop across this face 9d would normally be from approximately 1000 p.s.i. to atmosphere when the rings 9 and 10 are in an ideal running relationship to ring 24. Thus, area B of the ring 9 will be subjected to 2000 p.s.i.; that is, stuffing box or housing pressure, whereas the opposing annular area C will be subjected to 1000 p.s.i.; that is, pressure in chamber 30, and the net force tending to shift the ring 9 in a righthand direction will be the difference between the effective force at area B less the effective forces at areas C and F.

During operation of the seal the pressure drop across seal face 10d of ring 10 will vary somewhat as a result of which the annular areas A and H are more or less effective to overcome the effect of pressure gradient $G^1$ which varies as a function of the pressure drop across the face 10d. As the pressure drop across the face 10d varies, so also the pressure in the annulus 24b, and therefore the pressure chamber 30, varies, with the result that the pressure drop across face 9d of ring 9 will also vary, with consequent variation in the pressure gradient $G^2$ and with resultant variation in the effect of housing pressure on area B and pressure chamber pressure on annular area C.

It will be understood that unit pressure at area E is equal to stuffing box or housing pressure times the area A, plus the variable pressure in chamber 30 times the area H, minus the force created by the gradient $G^1$. Unit pressure at the area F is equal to stuffing box or housing pressure times the area B, minus the variable pressure in chamber 30 times the area C and the force created by gradient $G^2$. In the event that either ring 9 or ring 10 should back away from ring 24, the effective fluid pressure in the chamber 30 will either raise or lower, thus the force created by the gradients $G^1$ and $G^2$, as well as the pressure acting against areas C and H, will vary as a function of the pressure drop across the seal members.

Assuming a constant stuffing box pressure, should pressure in the annulus increase unit pressure at area F will decrease while unit pressure at area E will increase; whereas, should the pressure in the pressure chamber 30 decrease, unit pressure at area F will increase and unit pressure at area E will decrease, all as a function of variation in the pressure drop across the faces 9d and 10d.

Accordingly, the present invention provides a seal construction in which, as a function of the pressure drop across the concentric seal members 9 and 10, these members will, responsive to fluid pressure acting upon the areas previously described, seek out and maintain proper running relationship with respect to the face 24a' of ring 24, and while the leakage across the face, inherent in mechanical sealing constructions, will vary, the average leakage will remain substantially constant even when operating under high pressures since if leakage across one face increases, then the pressure sensitive members will respond to adjust leakage across the other member and effect adjustment of the first member to a normal running relationship.

Figure 3:
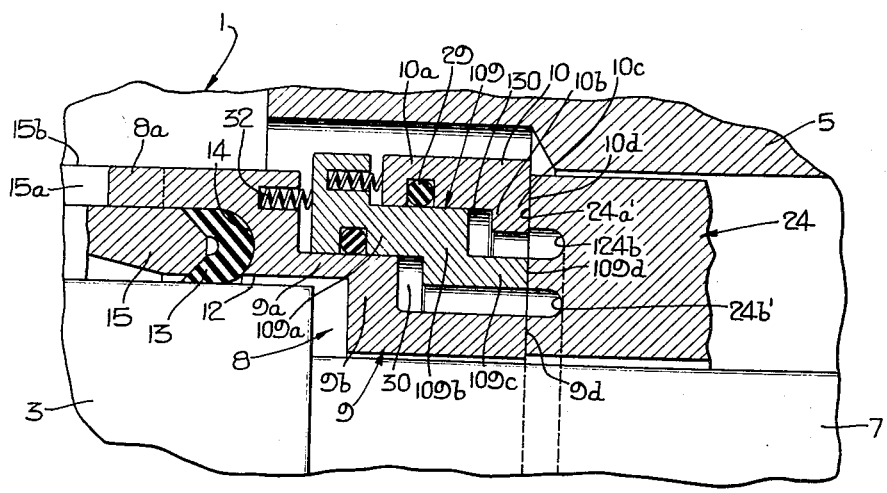
Figure 3 is an enlarged fragmentary view in longitudinal section illustrating a modified embodiment of the invention.

Passing now to the embodiment of the invention shown in Fig. 3, the same reference numerals are applied where applicable, and it will be noted that disposed between sealing ring members 9 and 10 is an additional sealing ring or member 109 which is provided with a mounting section 109a slidably supported upon mounting section 9a and ring 9, and upon which is slidably mounted mounting portion 10a of ring 10. Ring 109 is also provided with a central radially extended section 109b disposed between central sections 9b of ring 9 and 10b of ring 10, and defining therewith pressure chamber 30, as well as pressure chamber 130.

An end section 109c extends axially from the central section 109b of ring 109 and is provided with an end face 109d providing, in conjunction with faces 9d and 10d, a series of three radially spaced relatively narrow seal faces opposing the relatively broad seal face 24a' of member 24.

In addition to the annulus 24b' of member 24, it is also provided with a further annulus 124b. Accordingly, the breakdown of housing pressure across the relatively rotatable seal means 8 and 24, as shown in Fig. 3, to atmospheric pressure, is in three stages instead of in two stages as in the first described embodiment. Therefore, in a case where stuffing box pressure is on the order of 3000 p.s.i., there may conceivably be a pressure drop to 2000 p.s.i. at annulus 124b and from 2000 p.s.i. to 1000 p.s.i. between annulus 124b and 24b' when the parts are in an ideal running relationship. It will be understood, however, that self-adjustment of the rings 9 and 10 is a function of variations in the effective pressures. The respective pressures in the annuli 124b and 24b' will accordingly be active in pressure chambers 30 and 130 to effect automatic adjustment of the respective running positions of the rings 9, 10 and 109, as a function of the pressure drop across the faces 9d, 10d and 109d.

As a result of the present invention, a mechanical seal has been provided which is effective in high pressure applications, though the invention is not limited to high pressure uses wherein very nominal leakage across the faces will result and wherein the respective seal elements will not tend to score and be rendered inoperative as a result of high housing pressures acting thereon to press the same against the face of the opposing seal ring thus shutting off the flow of a lubricating film of fluid thereacross.

Other changes and alterations may be resorted to without departing from the spirit of the invention as defined in the appended claims.

I claim:

1. A mechanical seal for a member having a shaft opening and a shaft rotatable in said opening, comprising relatively rotatable sealing means connectible to said shaft and to said member for sealing said opening, said sealing means including an annular seal member having a relatively broad radially extended sealing face, a plurality of rings concentrically mounted one upon another and each having a radially extended seal face opposed to said broad face, sealing means between said rings and means responsive to the pressure of fluid passing between said opposed faces for adjusting the relative axial positions of said opposed faces.

2. A mechanical seal for a member having a shaft opening and a shaft rotatable in said opening, comprising relatively rotatable sealing means connectible to said shaft and to said member for sealing said opening, said sealing means including an annular seal member having a relatively broad radially extended sealing face, a plurality of rings concentrically mounted one upon another and each having a radially extended seal face opposed to said broad face, sealing means between said rings, said rings having fluid pressure responsive means for automatically adjusting the postions of said rings with respect to said broad sealing face.

3. A mechanical seal as defined in claim 2, wherein said annular seal member is provided with an annular channel disposed between the seal faces of the respective seal rings, said ring faces being separated by said channel, and said seal rings having a fluid pressure chamber therebetween communicating with said channel and having faces subjected to fluid pressure in said chamber.

4. A mechanical seal for a member having a shaft opening and a shaft rotatable in said opening, comprising relatively rotatable sealing means connectible to said shaft and to said member for sealing said opening, said sealing means including an annular seal member having a relatively broad radially extended sealing face, a plurality of rings concentrically mounted one upon another and each having a radially extended seal face opposed to said broad face, said rings having portions disposed in spaced relation and defining a pressure chamber therebetween for receiving fluid under pressure passing between said seal faces of said seal member and said rings, and said rings having surfaces subjected to fluid pressure in said chamber for partially balancing said rings against fluid pressure in said shaft opening.

5. A mechanical seal for a member having a shaft opening and a shaft rotatable in said opening, comprising relatively rotatable sealing means connectible to said shaft and to said member for sealing said opening, said sealing means including an annular seal member having a relatively broad radially extended sealing face, a pair of rings concentrically mounted one upon the other and each having radially extended seal faces opposed to said broad face, said rings having portions defining a pressure chamber between the rings for receiving fluid under pressure passing between the opposed faces of said seal member and said rings, and said rings having faces responsive to pressure in said chamber for adjusting the position of said rings relative to said seal member responsive to variations in the pressure of fluid in said chamber.

6. A mechanical seal assembly for a member having an opening therein and a shaft extending into said opening, said assembly comprising rotary seal means and stationary seal means for preventing the passage of fluid under pressure between said shaft and said opening, said rotary and stationary seal means having opposed radial faces between which there is a pressure drop from the pressure of fluid in the opening at one periphery of the sealing means to atmospheric pressure at the other periphery, that improvement wherein one of said seal means comprises a plurality of concentrically mounted relatively axially movable rings, each ring having a seal face opposed to the other seal means, and means for automatically adjusting the relative axial positions of said rings as a function of the pressure drop across the respective seal faces.

7. A mechanical seal assembly for a member having an opening therein and a shaft extending into said opening, said assembly comprising rotary seal means and stationary seal means for preventing the passage of fluid under pressure between said shaft and said opening, said rotary and stationary seal means having opposed radial faces between which there is a pressure drop from the pressure of fluid in the opening at one periphery of the sealing means to atmospheric pressure at the other periphery, that improvement wherein one of said seal means comprises a plurality of concentrically mounted relatively axially movable rings each having a seal face opposed to the other seal means, said rings having portions defining a pressure chamber therebetween communicating with the flow of fluid across said faces, and said rings having portions subjected to pressure in said chamber for shifting said rings with respect to one another as a function of variations in the pressure drop across said seal faces.

8. A mechanical seal as defined in claim 7, wherein said seal rings constitute said rotary seal means, said rings having means for connecting the rings for unitary rotation and for relative axial movement.

9. A mechanical seal as defined in claim 7, wherein said seal rings constitute said rotary seal means, said rings having means for connecting the rings for unitary rotation and for relative axial movement, and spring means for urging the respective rings axially toward said stationary seal means.

10. A mechanical seal for a member having a shaft opening and a shaft extending into said opening, said mechanical seal comprising mechanical sealing ring means operatively connectible to said shaft and to said member for sealing the opening, said ring means being subjected to high pressure at one periphery and to atmosphere at the other periphery whereby the pressure drop across said sealing ring means creates a pressure gradient across the sealing ring means tending to separate said sealing ring means, that improvement wherein said sealing ring means includes a ring having a relatively broad radial face, and a plurality of annular sealing elements, said elements having cooperative cylindrical surfaces concentrically mounting said elements for relative axial movements, said elements having radially spaced portions contiguous to said broad face of said ring, relatively narrow sealing faces on said portions opposed to said relatively broad face of said ring, said elements also having opposed radial pressure responsive surfaces and a pressure chamber between said surfaces communicating with the space between said faces for admitting fluid pressure to said pressure chamber as a function of variations in the pressure drop across the respective relatively narrow faces.

11. A seal as defined in claim 10 wherein said sealing elements are carried by said shaft for rotation therewith, said ring being connected to the member aforesaid so as to be relatively non-rotatable.

12. A seal as defined in claim 10, wherein said sealing elements are provided with sealing means between said cylindrical surfaces for sealing said pressure chamber.

13. A mechanical seal assembly comprising a first annular member having a cylindrical end section provided with a radial sealing face, a radially extended central section and a cylindrical mounting section projecting from said central section, and a second annular member having an end section concentrically disposed about said end section of said first member in radially spaced relation thereto, said second member having a mounting section shiftably supporting the second member on the mounting section of said first member, and a radially extended central section on said second member disposed in axially spaced relation to said central section of said first member.

14. An assembly as defined in claim 13, wherein said members are provided with means for connecting said members for rotation as a unit and for relative axial movement.

15. An assembly as defined in claim 13, wherein said members are provided with resilient means normally urging said central sections apart.

16. An assembly as defined in claim 13, wherein said mounting section of said second member is provided with sealing means engaged with the mounting section of said first member.

17. A mechanical seal assembly comprising a plurality of concentrically disposed annular members each having an axially extended end portion provided with a sealing face, a central section projecting radially relative to said end section, and a mounting section projecting axially from said central section, said mounting sections of said members being slidably engaged with one another, said central section of said members being spaced from one another and providing a pressure chamber therebetween, and said end sections being radially spaced from one another with the space therebetween communicating with said pressure chamber.

18. A mechanical seal assembly for a member having an opening therein and a shaft rotatable in said opening, said assembly comprising cooperative rotatable and stationary seal means connectible to said member and said shaft for preventing the passage of fluid under pressure between said shaft and said opening, said rotatable and stationary seal means having opposed radial seal faces, that improvement wherein one of said seal means includes a pair of relatively axially movable rings, a chamber interposed between said rings for the reception of fluid under pressure leaking across the radial seal face of one of said rings, and one of said rings having a fluid pressure responsive area exposed to the pressure of fluid in said chamber for effecting adjustment of the relative axial disposition of said latter ring and said stationary seal means as a function of variation of the pressure drop across the radial seal face of said latter ring from said opening to said chamber.

19. A mechanical seal assembly for a member having an opening therein and a shaft rotatable in said opening, said assembly comprising cooperative rotatable and stationary seal means connectible to said member and said shaft for preventing the passage of fluid under pressure between said shaft and said opening, said rotatable and stationary seal means having opposed radial seal faces, that improvement wherein one of said seal means includes a pair of relatively axially movable rings, a pressure chamber interposed between said rings for the reception of fluid under pressure leaking across the radial seal face of one of said rings, and means for adjusting the relative axial disposition of said rings in respect to the other of said seal means as a function of variation in the pressure drop across said seal faces to maintain a constant pressure in said chamber intermediate the pressure of fluid in said opening and atmospheric pressure.

20. A mechanical seal assembly for a member having an opening therein and a shaft rotatable in said opening, said assembly comprising cooperative rotatable and non-rotatable seal means connectible to said member and said shaft for preventing the passage of fluid under pressure through said opening, said seal means including a pair of rings axially movable one relative to the other and having radially extended opposed sealing faces subjected at one periphery to the pressure of fluid in said opening, and self-compensating means including a fluid pressure responsive area against which fluid pressure acts for urging said opposed sealing faces together, and walls defining a chamber for receiving fluid leakage between said sealing faces and communicating with said fluid pressure responsive area to impose thereon a fluid pressure determined by the rate of leakage into said chamber and effect relative axial adjustment of said pair of rings to automatically compensate for variations in the leakage rate between said sealing faces.

21. A mechanical seal assembly for a member having an opening therein and a shaft rotatable in said opening, said assembly comprising cooperative rotatable and non-rotatable seal means connectible to said member and said shaft for preventing the passage of fluid under pressure through said opening, said seal means including a pair of rings axially movable one relative to the other and having radially extended opposed sealing faces subjected at one periphery to the pressure of fluid in said opening, and self-compensating means also in said opening including a fluid pressure responsive area, and walls defining a chamber for receiving fluid leakage between said sealing faces, said chamber communicating with said fluid pressure responsive area to impose thereon a fluid pressure determined by the rate of leakage into said chamber and effect relative axial adjustment of said pair of rings to automatically compensate for variations in the leakage rate between said sealing faces, whereby the pressure applied across said sealing faces is adjusted as a function of a variation in the leakage across said sealing faces.

22. A mechanical seal assembly for a member having an opening therein and a shaft rotatable in said opening, said assembly comprising cooperative rotatable and non-rotatable seal means connectible to said member and said shaft for preventing the passage of fluid under pressure through said opening, said seal means including a pair of rings axially movable one relative to the other and having radially extended opposed sealing faces, and self-compensating means also in said opening responsive to fluid pressure in said opening for maintaining the pressure applied across said sealing faces substantially at a constant value intermediate the pressure in said opening and atmosphere, as a function of variation of said intermediate value, said self-compensating means comprising cooperative rotatable and non-rotatable seal means connected to said member and said shaft, one of said last-mentioned seal means including an axially movable ring having a radially extended face and a relatively stationary part having a radially extended face complemental to the radially extended face of said axially movable ring, said axially movable ring having a fluid pressure responsive surface facing oppositely to the radially extended face thereon and subjected to fluid pressure at the aforesaid substantially constant value intermediate the pressure in said opening and atmosphere.

References Cited in the file of this patent

UNITED STATES PATENTS

| | | |
|---|---|---|
| 1,315,822 | Doran | Sept. 9, 1919 |
| 2,033,403 | Smittle | Mar. 10, 1936 |
| 2,679,412 | Whitfield | May 25, 1954 |
| 2,824,759 | Tracy | Feb. 25, 1958 |